May 29, 1923.

P. J. McCLOSKEY

LEVER SLOT CLOSURE

Filed March 29, 1921

1,457,082

Inventor
Paul J. McCloskey,
By

Patented May 29, 1923.

1,457,082

UNITED STATES PATENT OFFICE.

PAUL J. McCLOSKEY, OF NEW BRUNSWICK, NEW JERSEY.

LEVER-SLOT CLOSURE.

Application filed March 29, 1921. Serial No. 456,770.

*To all whom it may concern:*

Be it known that PAUL J. McCLOSKEY, a citizen of the United States, residing at New Brunswick, in the county of Middlesex and State of New Jersey, has invented certain new and useful Improvements in Lever-Slot Closures, of which the following is a specification.

The object of the invention is to provide simple and efficient means, adapted to be applied when desired as an attachment, for closing the clutch lever slot in the floor of an automobile or like vehicle, or obviously any other similar slot permitting the operation of a lever and serving as a guide or clearance therefor, to prevent the access of air from the outside and causing a draught at the feet of the driver of a car with the attendant discomfort and risk, it being unavoidable that in the operation of the car the feet are located near such slot or slots and one of them usually being arranged more or less directly over the same.

It is a further object to provide for this purpose a device which can be applied to any type of car and embodies no moving or sliding parts requiring clearance or space for movement outside of the area of the lever slot itself and which when in place will not occupy a position which can by any possibility interfere with the operation of either the lever for which the slot is designed or any other element of the car construction.

With these and related objects in view, as will appear hereinafter, the invention consists in a construction and arrangement of parts of which a preferred embodiment is shown in the drawing, wherein.

Figure 1:
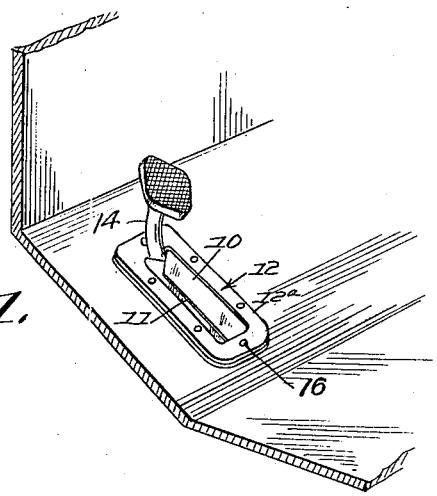
Figure 1 is a view of the closure applied in operative position to a lever slot or guide.

The closure consists essentially of laterally extending overlapping leaves or wings 10 and 11 of flexible, preferably resilient material, such as sheet rubber, secured at their outer edges, for example, to a marginal frame 12, in jointly spanning relation with the guide slot 13 of the vehicle floor in which the clutch lever 14 operates. The frame preferably comprises parallel coextensive centrally open plates $12^a$, $12^b$, of metal, fiber board or any suitable material secured together by rivets 15 or the equivalent thereof and having openings 16 for bolts, screws, or the like for attachment to the vehicle with the opening of the frame 12 in accurate registration with the lever slot. The outer edge of the leaves or wings are interposed between and firmly secured by these plates, and lie between the exterior or remote surfaces thereof.

Figure 2:
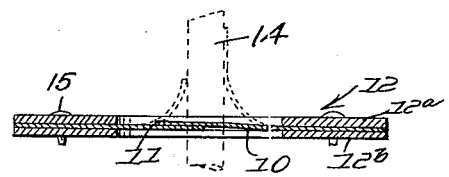
Figure 2 is a transverse section of the same, showing in dotted lines the deflection of the leaves by the lever as the latter is moved to disengage the clutch.
Figure 3:
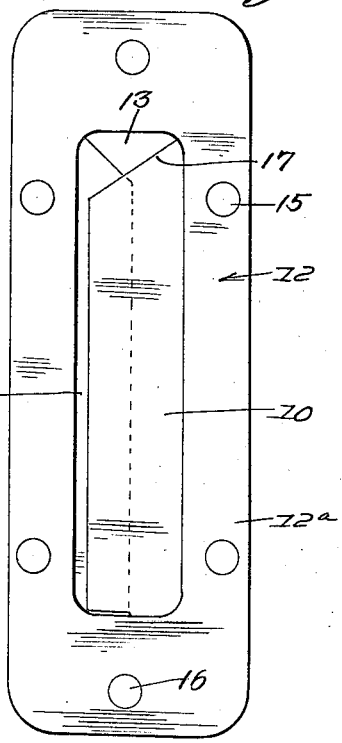
Figure 3 is a plan view of the attachment.
Figure 4:
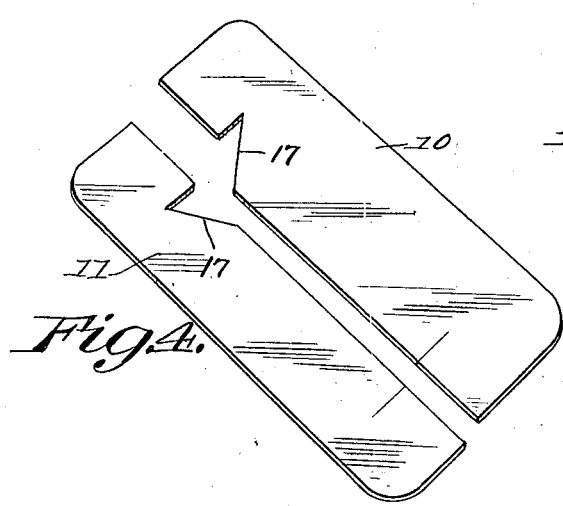
Figure 4 is a perspective view of the leaves.

At the forward end of the closure, or at that end in which the lever is located when the clutch is closed or when the lever is in what may be termed its normal position (which it occupies generally when the car is in operation) the leaves or wings are cut away, as at 17 to form beveled or diagonal, rearwardly convergent cam edges bounding in conjunction with the end wall of the opening in the frame, a seat for the reception of the lever. When the lever occupies this seat the leaves or wings are unrestrained and are free to lie in overlapping relation in the plane of the frame and thus effectually close the guide slot for the lever. When the lever is moved, however, its contact with the cam edges 17 serves to upwardly deflect the leaves or wings, as shown in dotted lines in Figure 2, to permit the lever to traverse the slot in the ordinary way, and without restraint or interference.

The device is simple and inexpensive and can be positioned without forming an appreciable or objectionable projection from the floor of the car, and when the lever is in its normal (operative) position the guide slot is effectually closed and draught therethrough excluded, without interposing any obstacle in the way of the ordinary operation of the lever.

What is claimed:

A closure for the guide slot of an auto clutch lever or the like, having laterally projecting yielding leaves or wings spanning the slot and transversely deflectable by the lever in traversing the slot, said leaves or wings having obliquely disposed cam end edges in the path of the lever.

PAUL J. McCLOSKEY